(12) United States Patent
Lubrano (10) Patent No.: US 7,685,122 B1
(45) Date of Patent: Mar. 23, 2010

(54) FACILITATING SUSPENSION OF BATCH APPLICATION PROGRAM ACCESS TO SHARED IMS RESOURCES

(75) Inventor: Anthony Louis Lubrano, Sugar Land, TX (US)

(73) Assignee: Neon Enterprise Software, Inc., Sugarland, TX (US)

( * ) Notice: Subject to any disclaimer, the term of this patent is extended or adjusted under 35 U.S.C. 154(b) by 1021 days.

(21) Appl. No.: 10/923,375

(22) Filed: Aug. 20, 2004

(51) Int. Cl.
G06F 7/00 (2006.01)
(52) U.S. Cl. .................................. 707/8; 707/1; 707/2
(58) Field of Classification Search ........... 707/1–104.1
See application file for complete search history.

(56) References Cited

U.S. PATENT DOCUMENTS

| | | | |
|---|---|---|---|
| 4,751,702 A * | 6/1988 | Beier et al. ................... | 714/13 |
| 5,155,678 A * | 10/1992 | Fukumoto et al. ........... | 707/202 |
| 6,092,086 A * | 7/2000 | Martin et al. ................ | 707/202 |
| 7,117,229 B2 * | 10/2006 | Marshall et al. ............. | 707/200 |
| 2003/0135478 A1 * | 7/2003 | Marshall et al. ................ | 707/1 |
| 2004/0098719 A1 * | 5/2004 | Smith et al. .................. | 718/101 |
| 2004/0172632 A1 * | 9/2004 | Smith et al. .................. | 718/101 |
| 2005/0256826 A1 * | 11/2005 | Hambrick et al. .............. | 707/1 |

* cited by examiner

Primary Examiner—James Trujillo
Assistant Examiner—Linh Black
(74) Attorney, Agent, or Firm—Michael P. Adams; Winstead P.C.

(57) ABSTRACT

The present invention includes aspects pertaining to enabling an IMS batch application program to temporarily release its access to IMS resources that it shares with an IMS database management system or other non-IMS system agent, without terminating the application program. The present invention identifies when the batch application program issues a call that generate a sync point, and disconnects the program's connection to the IMS resources. The batch application program retains access to any independently obtained non-IMS resources when the program is disconnected from the IMS resources. The IMS database management system or other non-IMS system agent has temporary exclusive access to the IMS resources after the batch application program connection is disconnected. After such temporary exclusive access is complete, the batch application program's connection to the IMS resources is reestablished, and the batch application receives a response to its original call that generated a sync point. In another embodiment of the present invention, a plurality of IMS batch application programs temporarily release their access to IMS resources. In this embodiment, the IMS database management system or other non-IMS system agent obtains temporary exclusive access to the IMS resources after all of said plurality of batch application program connections to IMS resources are disconnected.

12 Claims, 12 Drawing Sheets

Termination Command Process

Suspend Command Process

Resume Command Process

Fig. 6

Termination Request Process

Note: Wait for the IMS Interface Task to terminate. Arbitrarily detaching this subtask can cause the IMS Control Region to abnormally terminate.

FACILITATING SUSPENSION OF BATCH APPLICATION PROGRAM ACCESS TO SHARED IMS RESOURCES

BACKGROUND OF THE INVENTION

1. Field of the Invention

The invention relates to suspending accesses by IMS batch application programs to shared IMS resources. The invention also relates to IMS batch application programs maintaining control of independently obtained resources while the IMS system temporarily obtains exclusive control of the shared IMS resources.

2. Description of the Related Art

IBM's Information Management System ("IMS") is a widely used database management system. IMS "implemented the hierarchical model tree structure to organize the collection of records in a one-to-many entity-relationship data model." K. R. Blackman, *IMS Celebrates Thirty Years as an IBM Product,* IBM Systems Journal, Vol. 37, No. 4, 596 (1998). Today, a large percentage of the top worldwide companies in the areas of manufacturing, finance, banking, retailing, aerospace, communications, government, insurance, high technology, and health care use IMS to run their day-to-day database operations. Id. at 597.

"The IMS database (DB) function provides a full-function resource manager and a fast path resource manager for hierarchical database management . . . . The data managed by IMS are organized in hierarchical database records. A database record is composed of segments, a segment being the smallest piece of information that IMS can store. A segment contains fields that are the smallest pieces of data an application program can manipulate. A field is identified as a unique key field that can be used to navigate the database to find a specific segment. The hierarchical structure of the segments establishes the structure of the database record. A root segment identifies a database record, and a database record cannot exist without a root segment. Dependent segments are the pieces of data that complete the rest of a database record. The IMS DB full-function resource manager provides sequential access, indexed sequential access, and direct access for database processing. The fast path DB resource manager provides the direct method for processing data by using direct access pointers to the segments." Id. at 597-98. An OS dataset is a physical device on which an IMS database is stored.

"The fundamental architecture of IMS consists of a control region, a DLI secondary address space (DLISAS), a DBRC address space, an IRLM address space, and one or more dependent regions [hereinafter "IMS Database Management System" or "IMS system"]. The control region is the execution environment for the IMS system software, the control blocks, and storage pools required for managing communication access and application program scheduling. The control region also contains the fast path system software for managing access to fast path databases. This isolates the IMS system functions from the customer's application programs to maintain the integrity of the IMS system. The DLISAS execution environment contains the IMS DB full-function system software, control blocks, and storage pools for managing access to the full-function databases. The dependent regions provide the execution environments for the application programs to process transactions." Id. at 599.

Periodically, IMS databases need to be taken offline for maintenance. For example, because IMS databases become physically disorganized as the database is utilized and modified, they periodically need to be reorganized. The degree of disorganization is usually a function of the number of segments added, deleted, or updated. Segments being added or split as the result of an update tend to be physically located in a block other than their root segment or hierarchical predecessor. Subsequent retrieval of these new or split segments require additional DASD read requests, thus degrading the performance of the database. If a database is not reorganized, its performance degrades, at least in part because more I/O operations are required to retrieve data. Unloading and reloading a complete database is a common technique used to reorganize a database. This technique requires that the entire database be offline and unavailable during the period of time that that database is being reorganized. When a database is reorganized, its primary and secondary indexes have to be updated as well.

Dependent regions are divided into short running thread and long running thread dependent regions. If only short running thread dependent regions are accessing the shared IMS resources (e.g., an IMS database) and IMS needs to access the shared IMS shared resources (e.g., to perform maintenance of a database), IMS will allow such access. However, processing by any and all IMS Batch Message Processing (BMP) regions, or Data Language 1 (DL1) regions including DBB regions (hereinafter "IMS batch regions"), which are long running thread dependent regions, must be terminated or abended to release control of the shared IMS resources to the IMS system.

By terminating processing of the IMS batch regions, business application programs become unavailable. This is perceived as an undesirable outage or period of downtime to users of the business application. Furthermore, if application programs are terminated or abended prematurely, this prevents application continuity. For example, an application may be terminated in the middle of printing a report, and a complete report may have to be printed in pieces. Furthermore, when application programs are terminated, resources need to be expended to restart such applications. In addition, there is greater risk of operational impact when applications are restarted, such as operator error. Also, to be able to restart an application program, it must implement, or be modified to implement, functional restart and repositioning programming.

On the other hand, if IMS batch regions are not terminated, and business applications are allowed to continue running, maintenance of the IMS resources (e.g., IMS database) cannot occur and less than optimum performance may result.

Thus, this has caused a dilemma in the prior art between the desirability of application program availability versus IMS resource maintenance.

BMC Software's Application Restart Control ("ARC") product allows IMS resources being utilized by an application program to be released without terminating the job step. However, the ARC product abends the application program and then must restart it for it to resume operations. Thus, the application program must include, or be modified to include, restart programming. Furthermore, the ARC product supports only BMP IMS application programs and not DL1 or DBB IMS application programs.

It should also be noted that IMS batch jobs can be running while the IMS system is offline. Nonetheless, even if these IMS batch jobs have exclusive access to IMS resources while the IMS system is offline, they may preclude tasks such as batch database reorganizations, and DASD management functions, such as volume defrag, database dataset moves from one DASD volume to another, and Disaster Recovery backups, and other general DASD management issues. These tasks and general DASD management issues are performed by a system hereinafter referred to as a "non-IMS system agent." Thus, there also is a need for such IMS batch jobs to temporarily suspend their access to IMS resources shared with such a non-IMS system agent.

Therefore, a need exists for the capability of suspending accesses by BMP, DL1, or DBB IMS application programs to shared IMS resources without terminating or abending the programs. A further need exists for enabling BMP, DL1, and DBB IMS application programs to resume their accesses to shared IMS resources, after suspension, without requiring the application programs to be restarted or for them to contain restart programming. Still another need exists for an external interface to such application program suspend and resume capability.

SUMMARY OF THE INVENTION

The present invention includes aspects pertaining to enabling an IMS batch application program to temporarily release its access to IMS resources that it shares with an IMS database management system or other non-IMS system agent, without terminating the application program. Such batch application programs include one of the following types:

(i) a DL1 IMS application program;
(ii) a DBB IMS application program; or
(iii) a BMP IMS application program.

The present invention identifies when the batch application program issues a call that generate a sync point, and disconnects the program's connection to the IMS resources. The batch application program's connection to the IMS resources may be disconnected by enabling IMS interface processing to run under a different Task Control Block than the application program. The batch application program retains access to any independently obtained non-IMS resources when the program is disconnected from the IMS resources. The IMS database management system or other non-IMS system agent has temporary exclusive access to the IMS resources after the batch application program connection is disconnected. After such temporary exclusive access is complete, the batch application program's connection to the IMS resources is reestablished, and the batch application receives a response to its original call that generated a sync point.

In another embodiment of the present invention, a plurality of IMS batch application programs temporarily release their access to IMS resources. In this embodiment, the IMS database management system or other non-IMS system agent obtains temporary exclusive access to the IMS resources after all of said plurality of batch application program connections to IMS resources are disconnected.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DESCRIPTION OF THE PREFERRED EMBODIMENT(S)

The present invention allows an IMS batch region to release all resources obtained on its behalf by IMS, without releasing control of any independently obtained resources. The present invention further allows the IMS system, or other non-IMS system agent, to temporarily obtain exclusive control of the IMS resources being shared with the IMS batch region while maintaining continuous availability of, and access to, non-IMS resources. The IMS batch region is able to later re-establish its use of IMS resources without any negative impact on the IMS system, non-IMS system agent, or the IMS batch region. Internally, the IMS batch region has no knowledge of, nor impact from, the release and re-acquisition of the IMS resources. Batch application programs do not need to be abandoned, when the IMS resources are released, or restarted when the IMS resources are reacquired. The present invention further provides for external control or external interface, via a MVS console operator, to "SUSPEND" and "RESUME" use of the shared IMS resources. The MVS console operator may be a person or an application program.

In the prior art, an IMS batch region must be terminated in order for it to release control of resources (usually databases) obtained for it by IMS. For example, a BMP region may cause a /DBR or /DBD command to fail because it has the database specified in its program specification block ("PSB"). This causes the command to fail forcing IMS to retain the resources on behalf of the BMP region. IMS resources typically consist of databases, but may also include log datasets or recon datasets.

Due to business requirements, it may be necessary to allow the IMS batch region to complete its processing before it can be terminated. This causes a paradox as the IMS resources must be maintained in order to assure maximum performance yet as discussed above it is undesirable for the business application programs to be temporarily stopped to perform this maintenance. As discussed above, if the shared IMS resources comprise databases, such databases need to be maintained by, for example, reorganizing them.

However, by separating the business application functions from the IMS interface, access to the IMS resources can be temporarily "suspended" while the business application functions maintain their non-IMS connectivity. Such temporary suspension will be perceived as a longer response time to a call as opposed to an outage.

The present invention separates the IMS interface from the business application programs through use of two Task Control Blocks ("TCBs"). This allows the IMS interface to be repeatedly stopped and restarted without stopping and restarting the business applications. The present invention creates duplicates of the following control blocks that will be referenced by the business application program:

PCBs
PXPARMS (or DFSECP) control block
DFSRRT control block

The present invention also "front-ends" the IMS Language Interface routine. This allows the present invention to: (i) identify a clean stopping point for the IMS interface. A clean stopping point is a DL/I call that results in IMS committing updates, such as data updates or backing out updates (also referred to as a "rollback") (such committing of updates is hereinafter referred to as a "sync point"); (ii) through address translation, facilitate the usage of the "copied" IMS control blocks to the "real" IMS control blocks; and (iii) move the DL/I Call from the business application program TCB to the IMS Interface TCB.

Figure 1A:
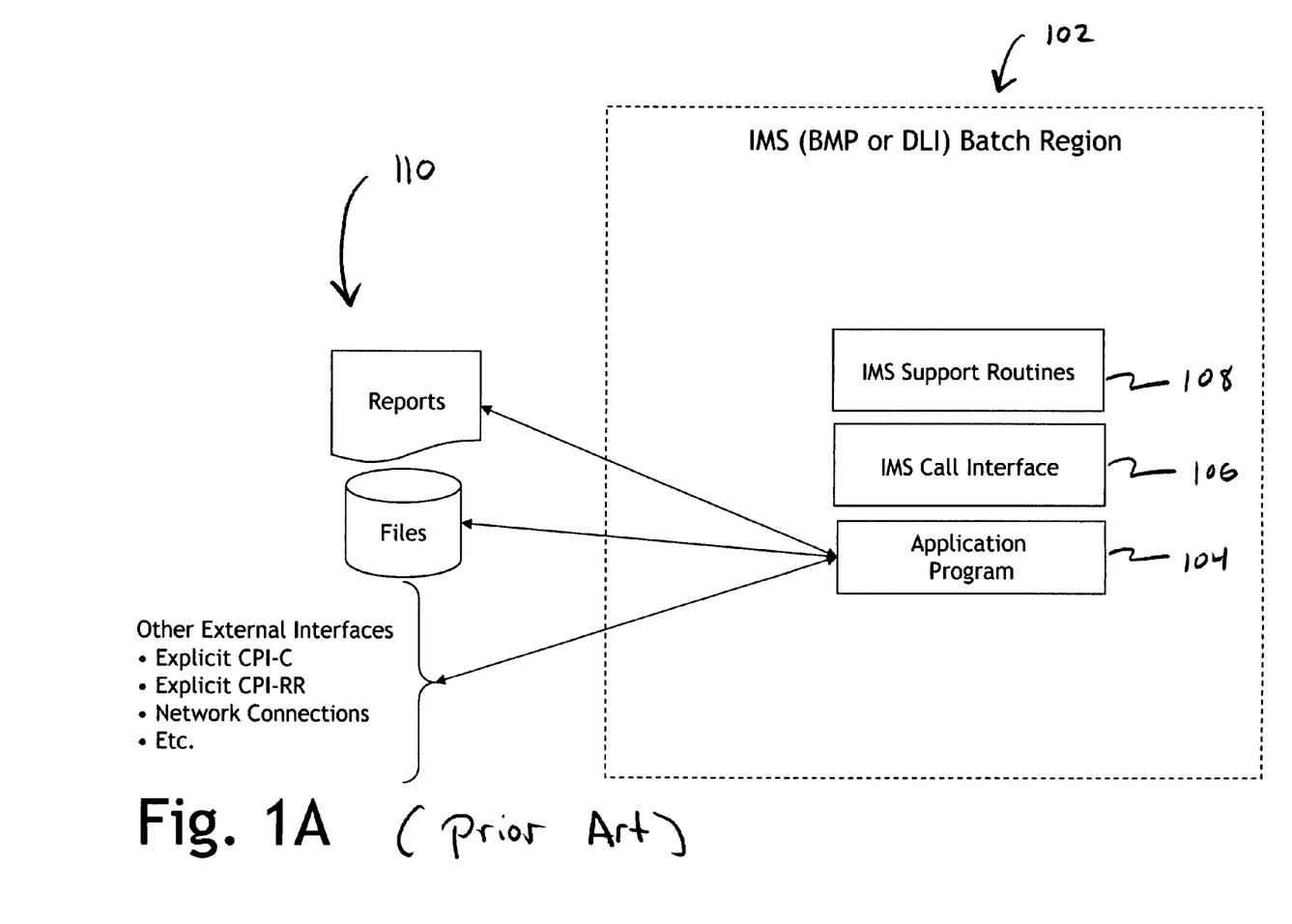
FIG. 1A (prior art) is a block diagram illustrating a typical processing environment for an IMS batch application program.

FIG. 1A illustrates the typical components involved in the prior art when an IMS batch region 102 is processing, and an application program 104 is being executed in that region. IMS support routines 108 are used to launch application program 104. Application program 104 makes calls to the IMS system through IMS call interface 106, and thereby obtains access to shared IMS resources. The application program 104 also has access to non-IMS resources 110 (e.g., reports files and other external interfaces).

Figure 1B:
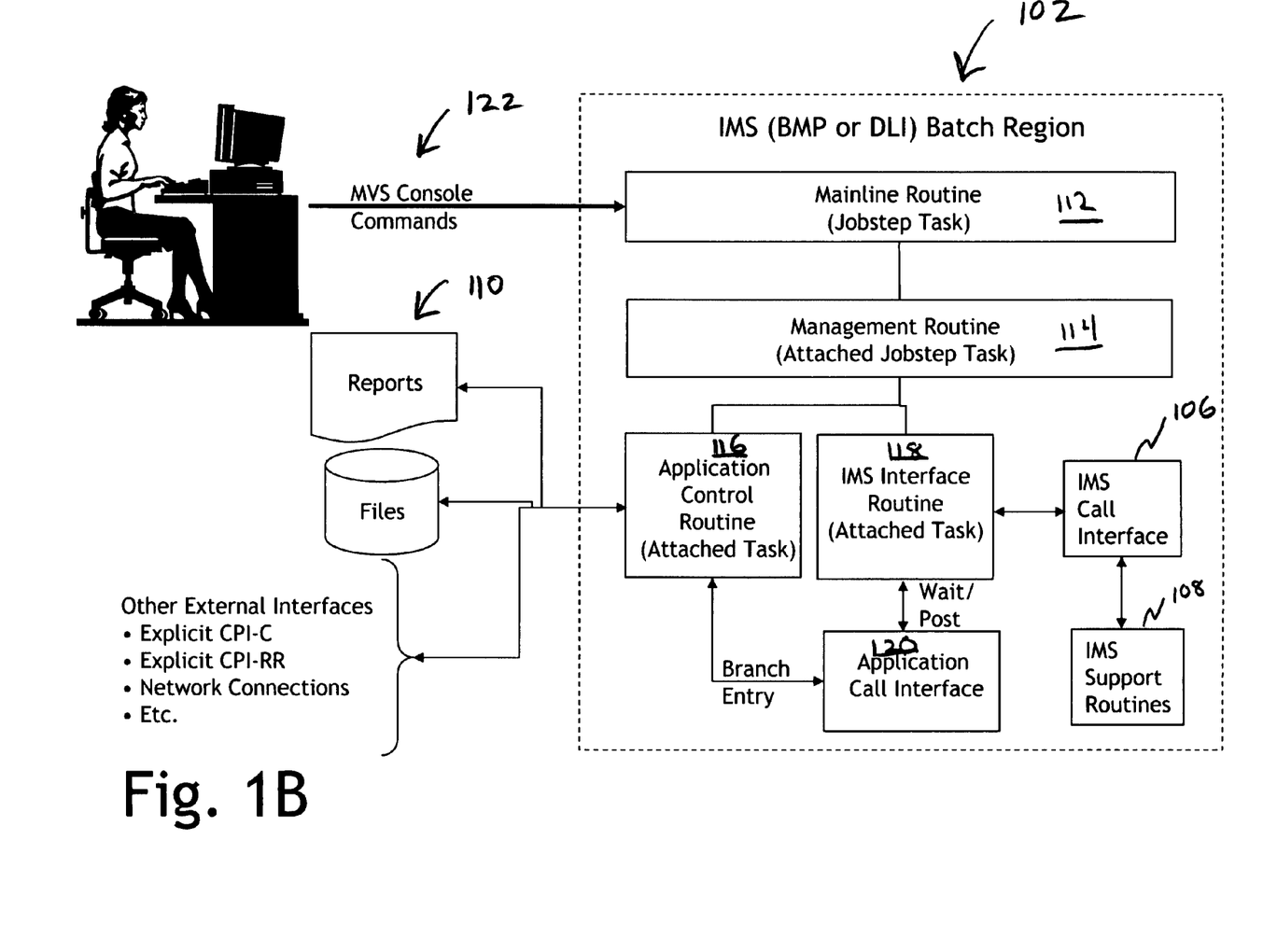
FIG. 1B illustrates a processing environment for an IMS batch application program in accordance with an embodiment of the present invention.

FIG. 1B illustrates the routines of the present invention that reside in the IMS batch region 102 to enable the batch region to release all resources obtained on its behalf by the IMS system, with releasing control of any independently obtained resources 110. The present invention comprises the following main routines (discussed in more detail below): (i) mainline routine 112; (ii) management routine 114; (iii) application control routine 116; (iv) IMS interface routine 118; and (v) application call interface 120. IMS interface routine 118 interfaces to IMS call interface 106 and IMS support routines 108. The application program (not shown) runs in the environment created by application control region 116. As discussed above, the present invention provides for external control or external interface, via MVS console operator 122, to "SUSPEND" and "RESUME" use of the shared IMS resources. As discussed below, mainline routine 112 waits for MVS console commands from MVS console operator 122.

Mainline Routine

The purpose of this routine is to provide an APF authorized interface into, what may be, an non-APF authorized business application program.

In order to enable certain capabilities, this routine must run from an APF authorized load library. As illustrated in the flow diagram of FIG. 2, in step 200 this routine attaches a Management Routine (discussed below) using a non-APF authorized load library, and provides an interface for MVS Console Commands. A MVS Console Command is a command issued via the MVS MODIFY command interface. This command interface is designed to support commands issued via any program that emulates an MVS Console or directly from an MVS Console.

Figure 2:
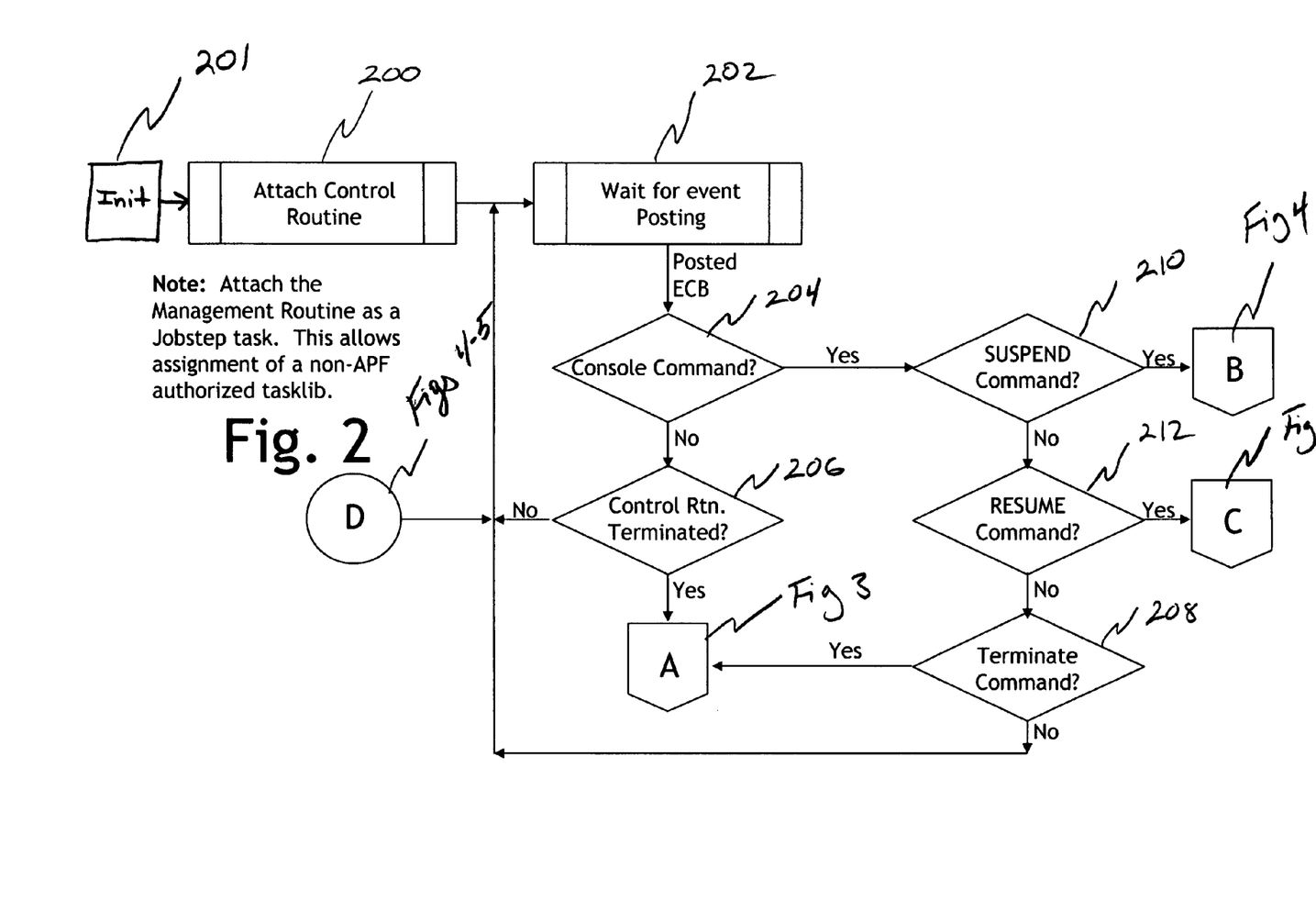
FIGS. 2-11 are flow diagrams illustrating the sequence of operations that may be performed in accordance with an embodiment of the present invention.

In step 202, the Mainline Routine waits for MVS Console Commands (step 204) or for the Management Routine to terminate (step 206).

Figure 3:
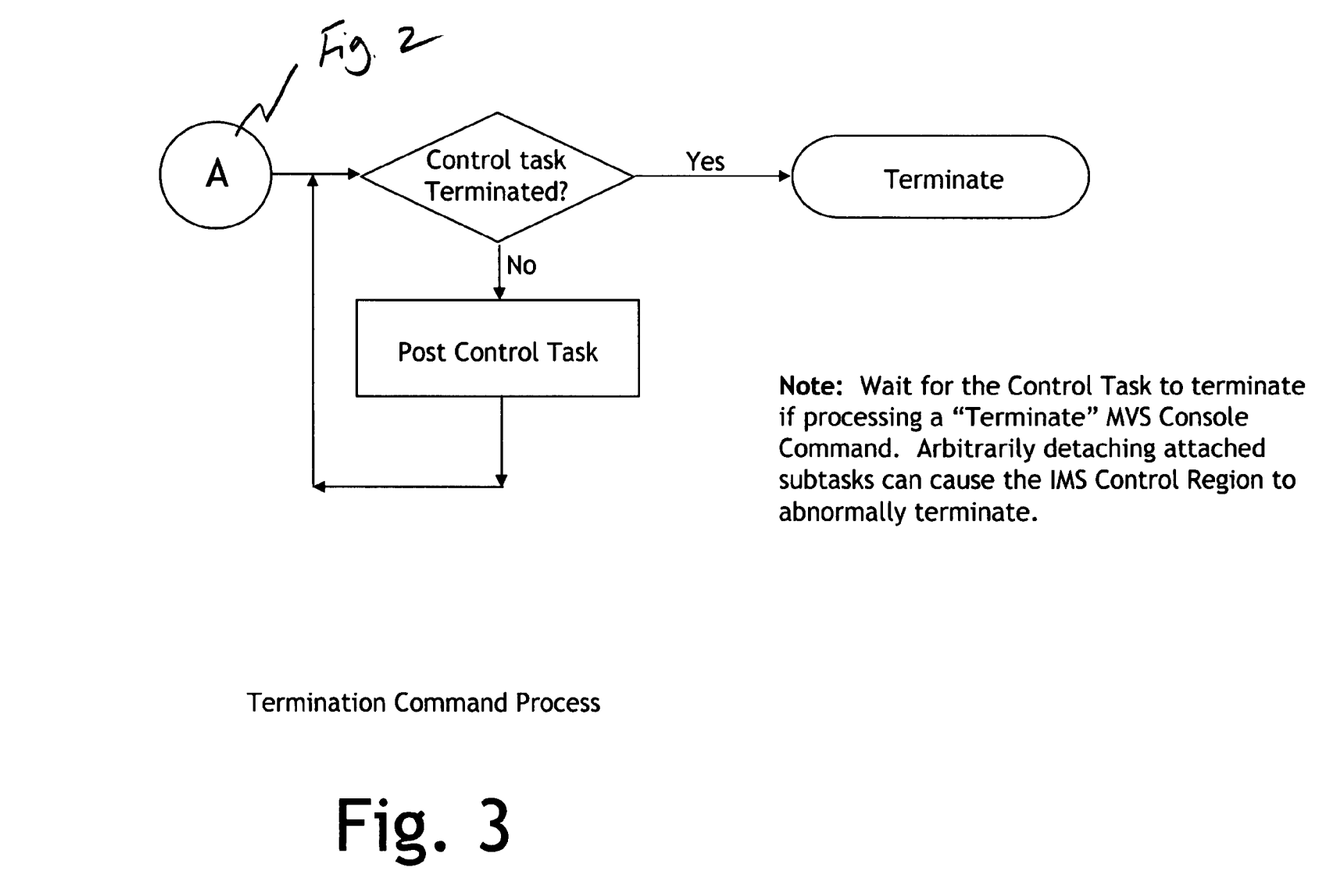
Figure 4:
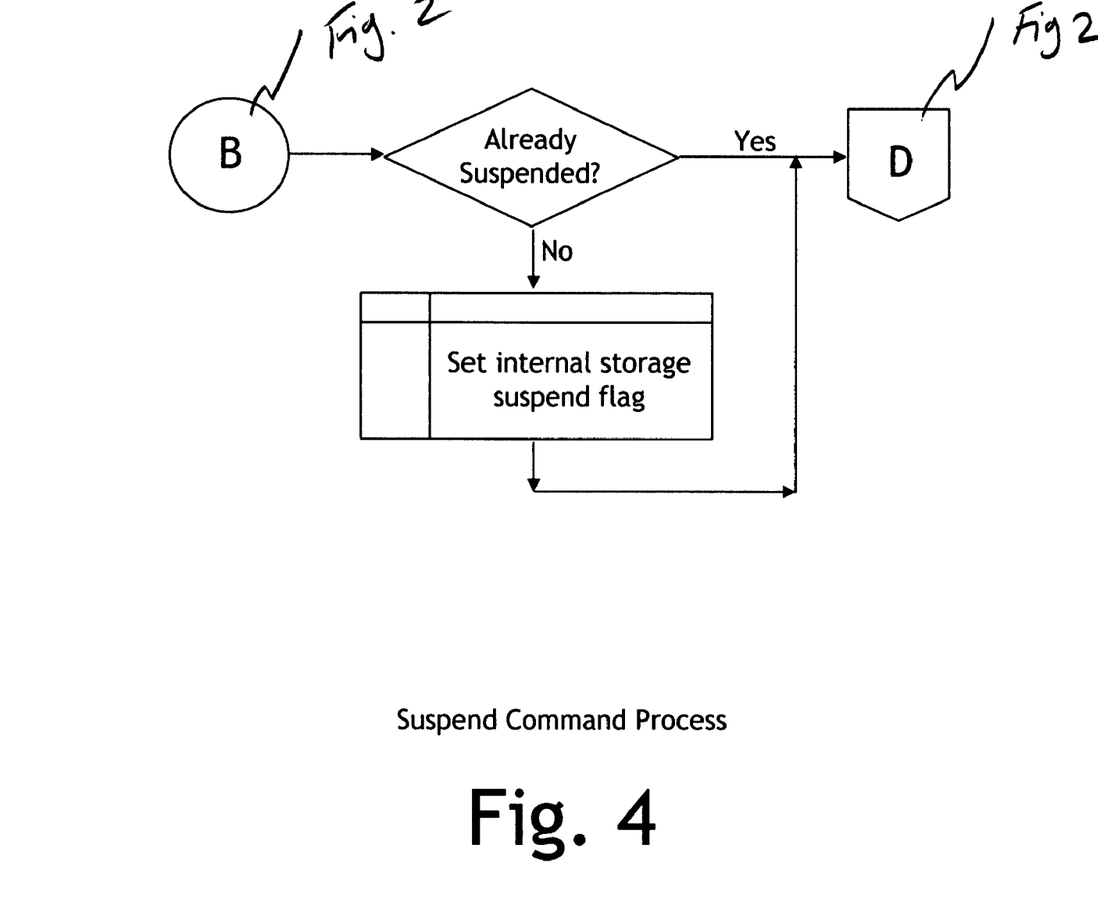
Figure 5:
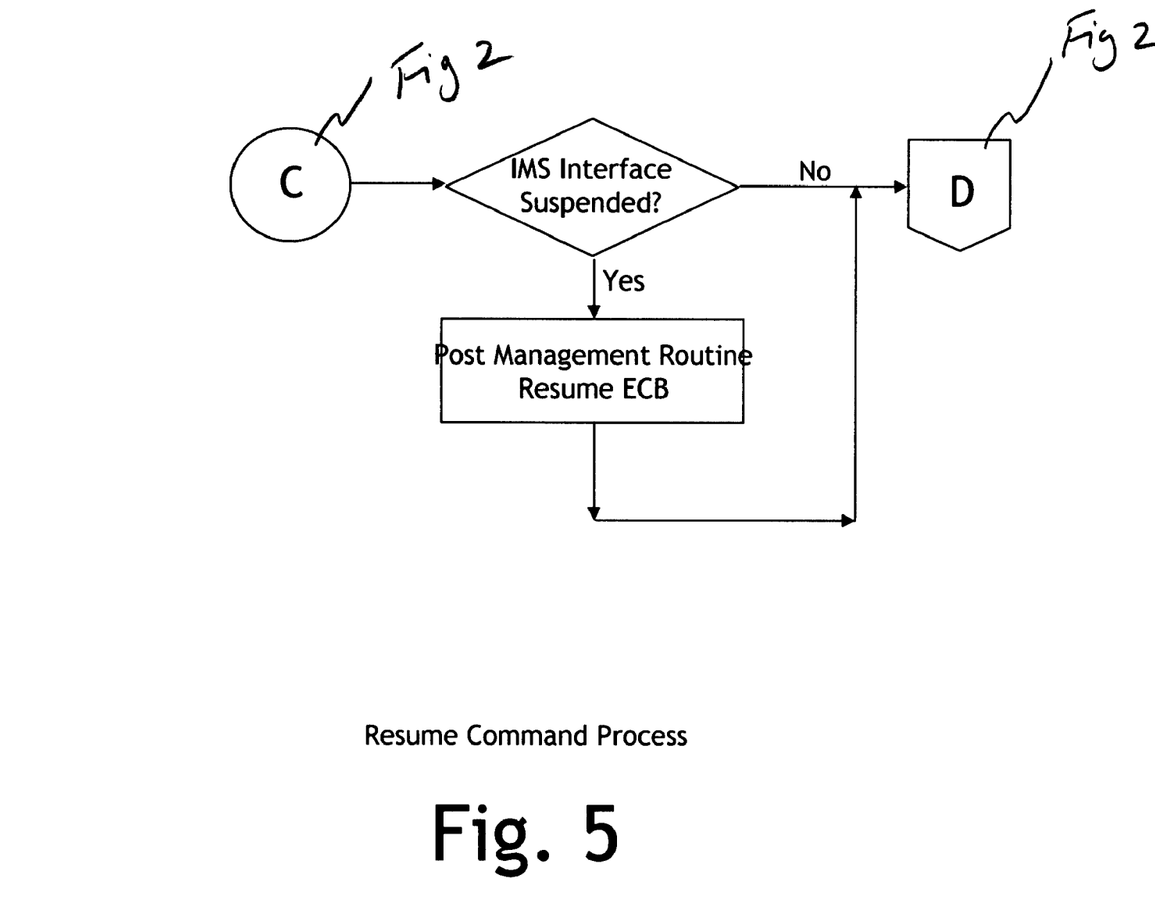

MVS Console Commands can direct the Mainline Routine to terminate processing (step 208 and FIG. 3), suspend the IMS interface (step 210 and FIG. 4) or resume the IMS interface (step 212 and FIG. 5). Other MVS Console Commands include checkpoint pacing and status.

During initialization (step 201), this routine scans the user-supplied parameter for the Application Program name. The Application Program name is saved and the IMS Interface Routine (discussed below) name is substituted for this name in the parameter string. Finally, the modified string is saved for use by the Management Routine.

In addition, during step 201, this routine loads the Application Call Interface Routines (discussed below). These routines will replace the IMS Language Interface Routines (DFSLIE00, DFSLIE20, DFSESPR0 and DFSEIPB0). This routine saves the addresses of the Application Call Interface Routines in local storage as they will be needed by the Application Control Routine.

Management Routine

The purpose of this routine is to provide a non-APF authorized routine that allows the IMS interface processing to run under a different TCB than the business application program.

Figure 6:
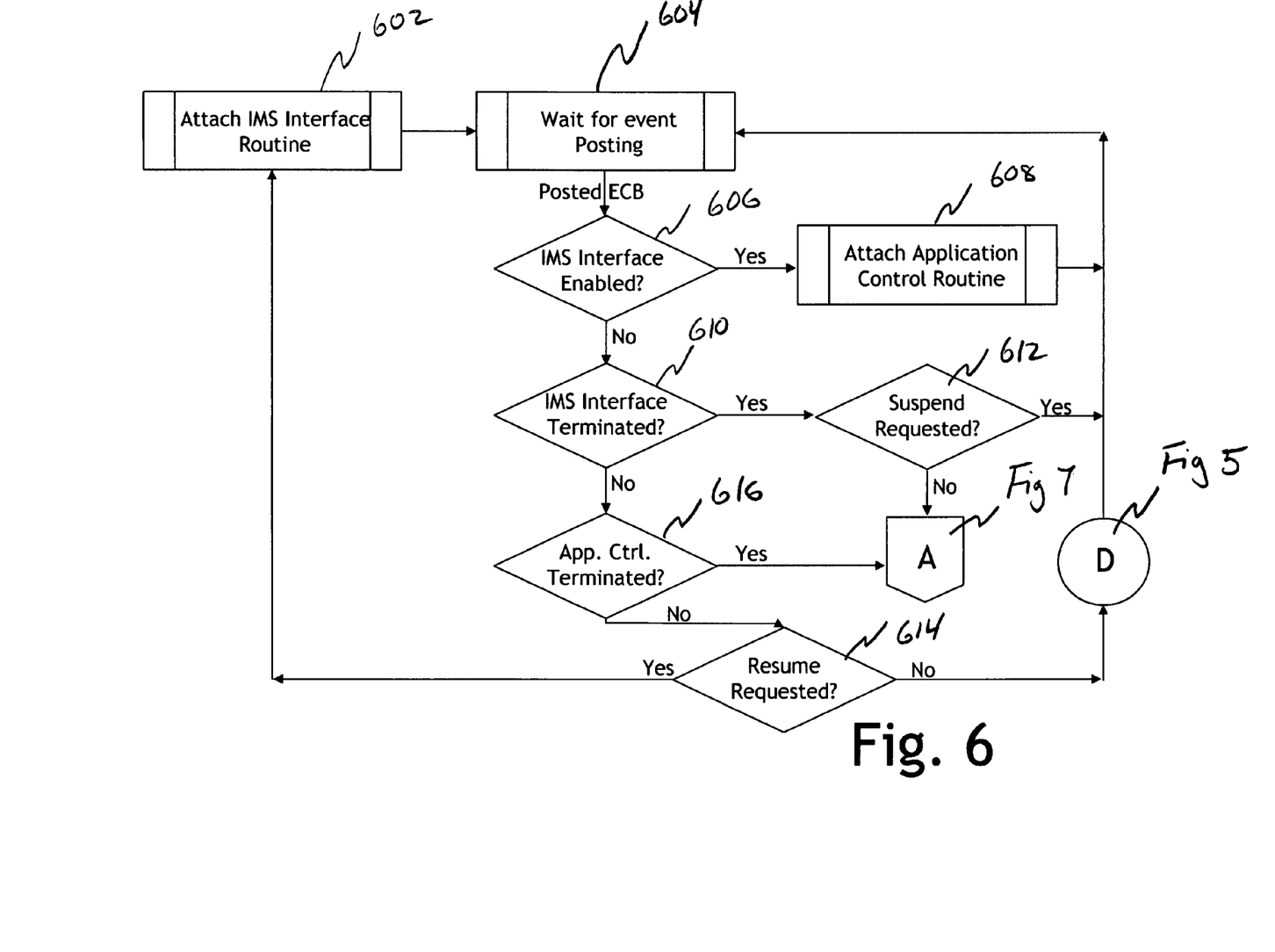

As illustrated in FIG. 6, in step 602, it does this by attaching an IMS Region Controller (DFSRRC00), using the modified parameter string created by the Mainline Routine, as a non-Jobstep subtask. The parameter directs the IMS Region Controller to ultimately call the supplied IMS Interface Routine.

In step 604, the routine waits for an event posting indicating that the IMS interface is enabled or terminated or the Application Control Routine is terminated. In step 606, if the IMS interface routine is connected to IMS, this routine will then attach the Application Control Routine as a non-Jobstep subtask (step 608).

If the IMS Interface routine terminates (step 610) as the result of a "SUSPEND" MVS Console Command (step 612), the Management Routine will establish a "RESUME" ECB (step 614) that it will wait on (FIG. 5). When posted, the Management Routine will re-attach the IMS interface routine (step 602).

It is preferable to attach the Application Control Routine and IMS Interface Routine such that they do not share the use of Storage Subpool 0 (zero), and thereby the IMS Interface Routine can be repeatedly terminated and restarted without orphaning any residual storage.

Figure 7:
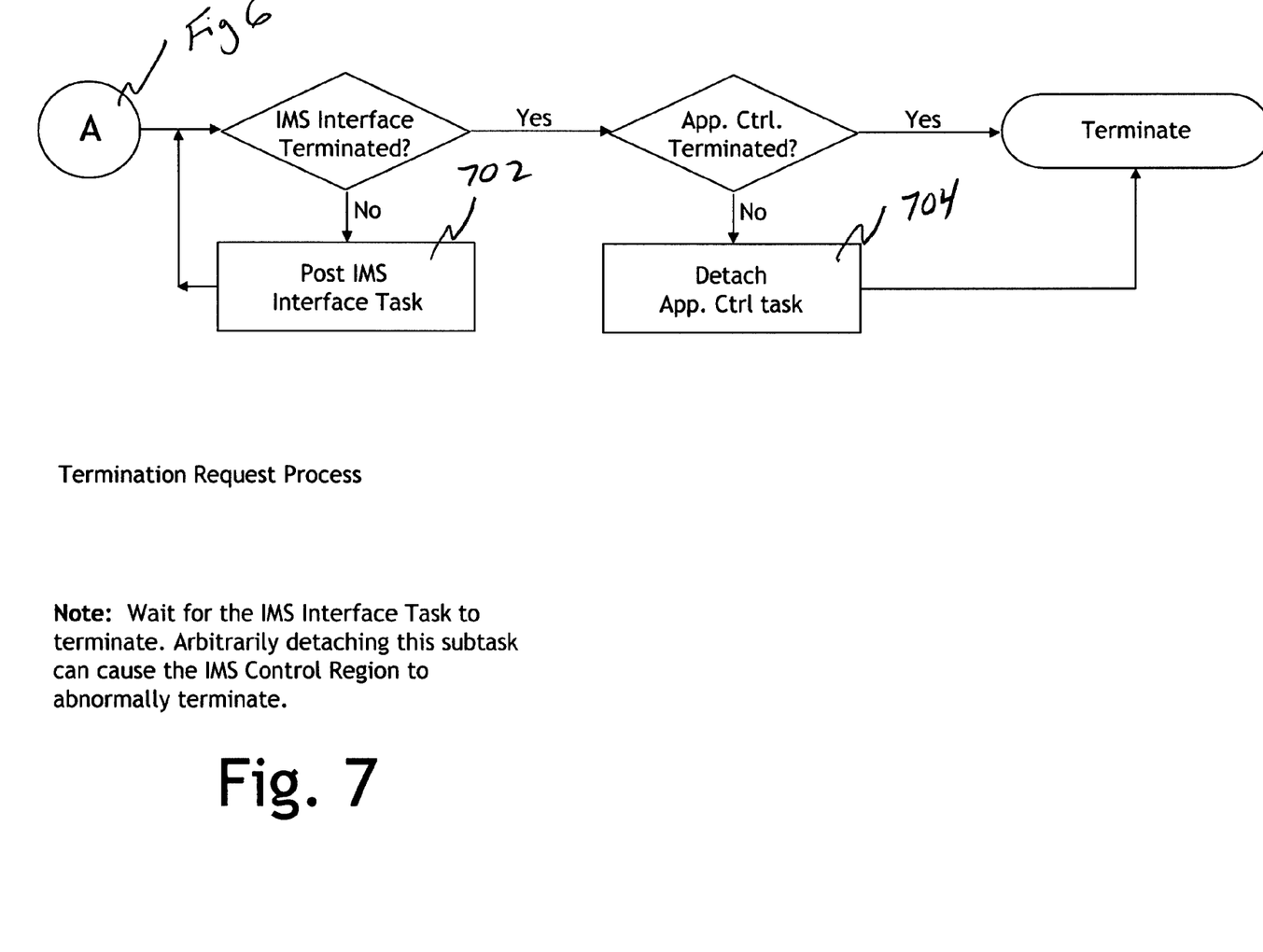

If the Application Control Routine subtask terminates (step 616), the Management Routine will post the IMS interface routine to terminate (FIG. 7) and return control to the Mainline Routine (FIG. 2). As illustrated in FIG. 7, unless the IMS interface and application task are already terminated, such termination and return of control to the Mainline Routine involves posting the IMS interface task to terminate (step 702) and detaching the application control task (step 704).

IMS Interface Routine

Figure 8:
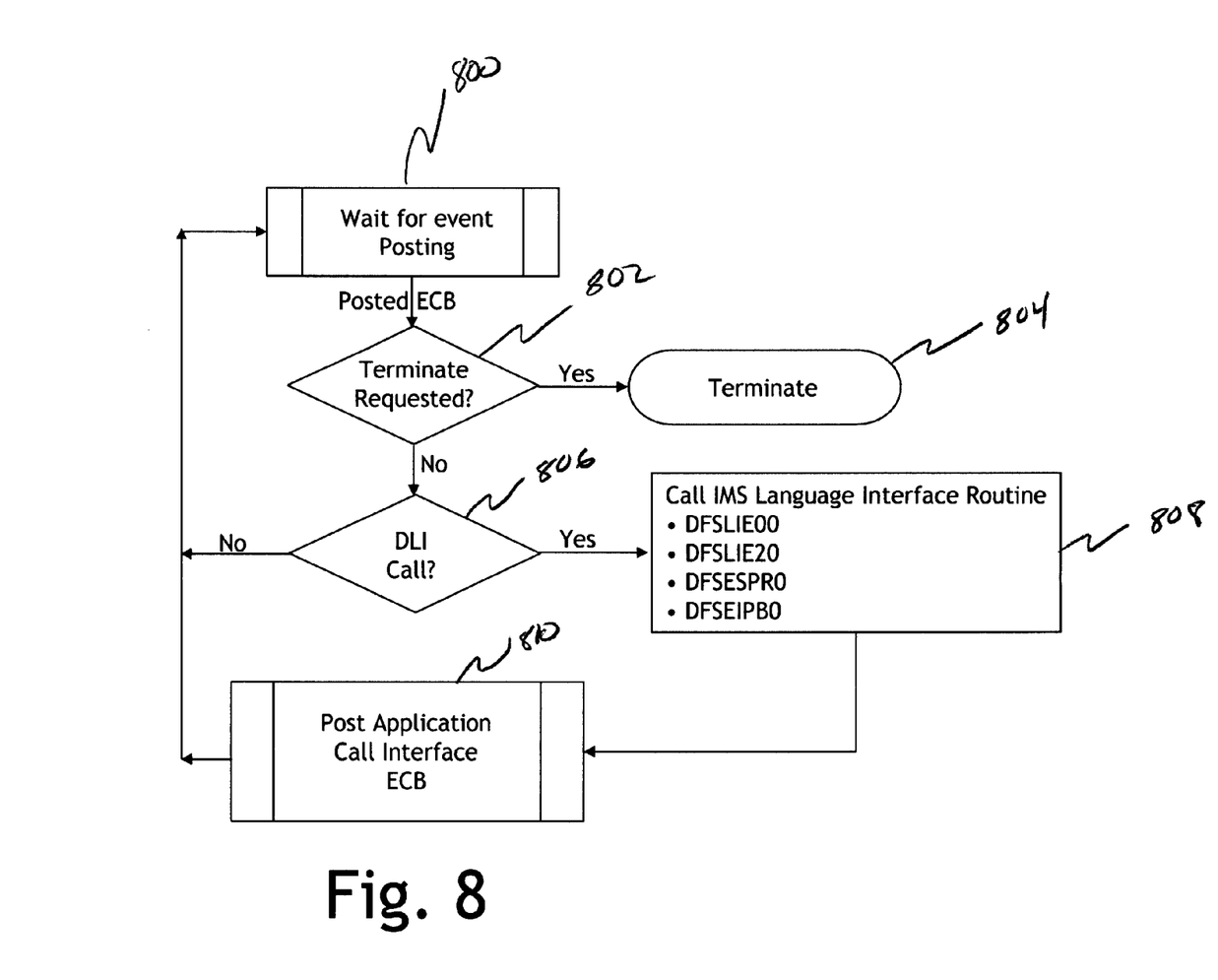

The purpose of this routine is to act as the IMS BMP or DLI Batch application program. The Management Routine attaches the IMS Region Control program (DFSRRC00) with a modified parameter. This IMS Interface Routine is ultimately called (or LINKed) by the IMS Region Control program.

As illustrated in FIG. 8, this routine then waits on two Event Control Blocks ("ECB's") (step 800):

(1) A termination ECB (step 802). When posted, this routine terminates (step 804).

(2) A DL/I Call Interface ECB (step 806). When posted, this routine branches to the appropriate IMS language interface modules (step 808) and posts an application call interface ECB (step 810).

During initialization, this routine should save its parameter pointer (Register 1) in an internal storage area such that the Application Control Routine can locate it. This is to facilitate the construction of a duplicate PCB list for the Application Program.

During initialization, this routine should also save the IMS Language Interface Routine addresses into a local storage area. Specifically, this routine should save the following routines:

DFSLIE00—From PXPARMS.LIPRXX
DFSLIE20—From DFSRRT.RRTAILI
DFSESPR0—From DFSRRT.RRTESPR
DFSEIPB0—From DFSRRT.RRTEDLI Note that the DFSECP (or PXPARMS) control block points to the DFSRRT (see DFSECP.ECESPRHT).

Application Control Routine

The purpose of this routine is to create an environment that will allow the application program to run and to ensure the IMS Language Interface module (DFSLI000) will function properly. To this end, this routine performs the following steps:

(iv) Create a copy of the PXPARMS (or DFSECP) control block from the IMS Interface Task. See FIG. 9 (step 902). This control block is pointed to by the R1 save area pointed to by the TCB First Save Area pointer (TCBFSA). When copying this block, several internal addresses must be adjusted for the new control block. Specifically, RRGPARMS, RRCPARMS, RPCPARMS and RLIPARMS must be adjusted to point to appropriate areas in the new block.

Figure 9:
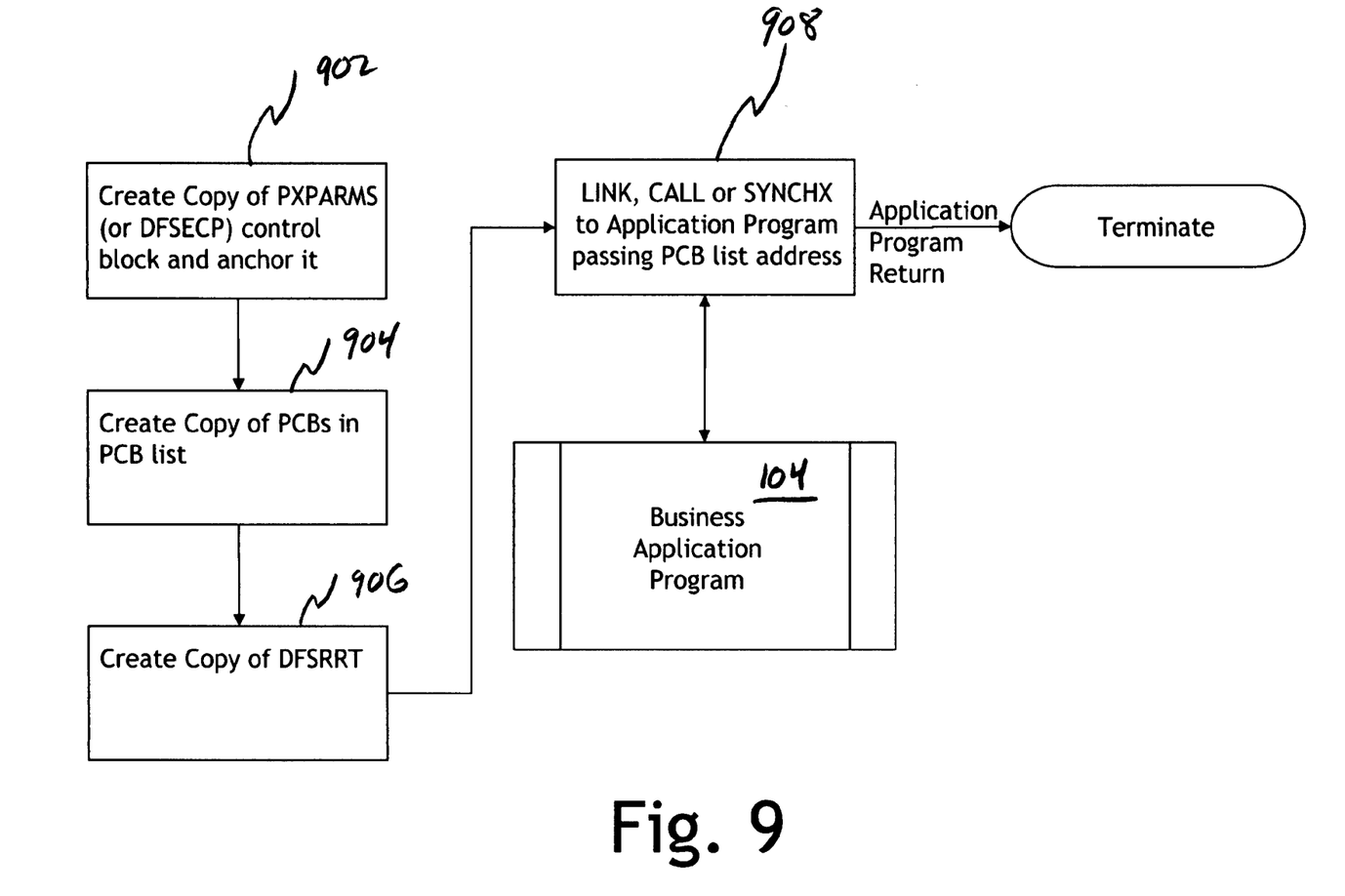

(v) Replace the R1 save area pointed to by the TCB First Save Area pointer (TCBFSA) of the Application Control Routine TCB with the address of the PXPARMS (or DFSECP) copy. This process is referred to as "anchor it" in step 902.

(vi) Create a copy of each PCB in the PCB list passed to the IMS Interface Routine (step 904). And build a parameter list for the Application Program that reflects the copied PCB list. You will need to obtain the address of the IMS Interface Routine's PCB list from the internal storage area where it was saved.

(vii) Create Copy of the IMS Resource Routing Table (DFSRRT) (step 906). This table contains the addresses of the IMS Language Interface Routines. Specifically, replace the RRTAILI, RRTESPR and RRTEDLI addresses with the Application Call Interface Routine addresses. Note that the DFSLIE00 routine address can be found in the PXPARMS (LIPRXX) control block.

Preferably, this routine will LINK, CALL or SYNCHX (step 908) to the application program 104 but not ATTACH another TCB. ATTACHing another TCB will require that the PXPARMS (or DFSECP) control block pointers be reset in the new TCB.

Application Call Interface

This routine exists to move the IMS DL/I call from the application program TCB to the IMS Interface Routine TCB. It also detects that the IMS Interface is to be "suspended" and consequently will check for a DL/I call that causes IMS to commit (or sync point) the application. A sync point is caused by a "GU" call to the I/O PCB, a "CHKP" call, a "SYNC" call, or a ROLB call.

Figure 10:
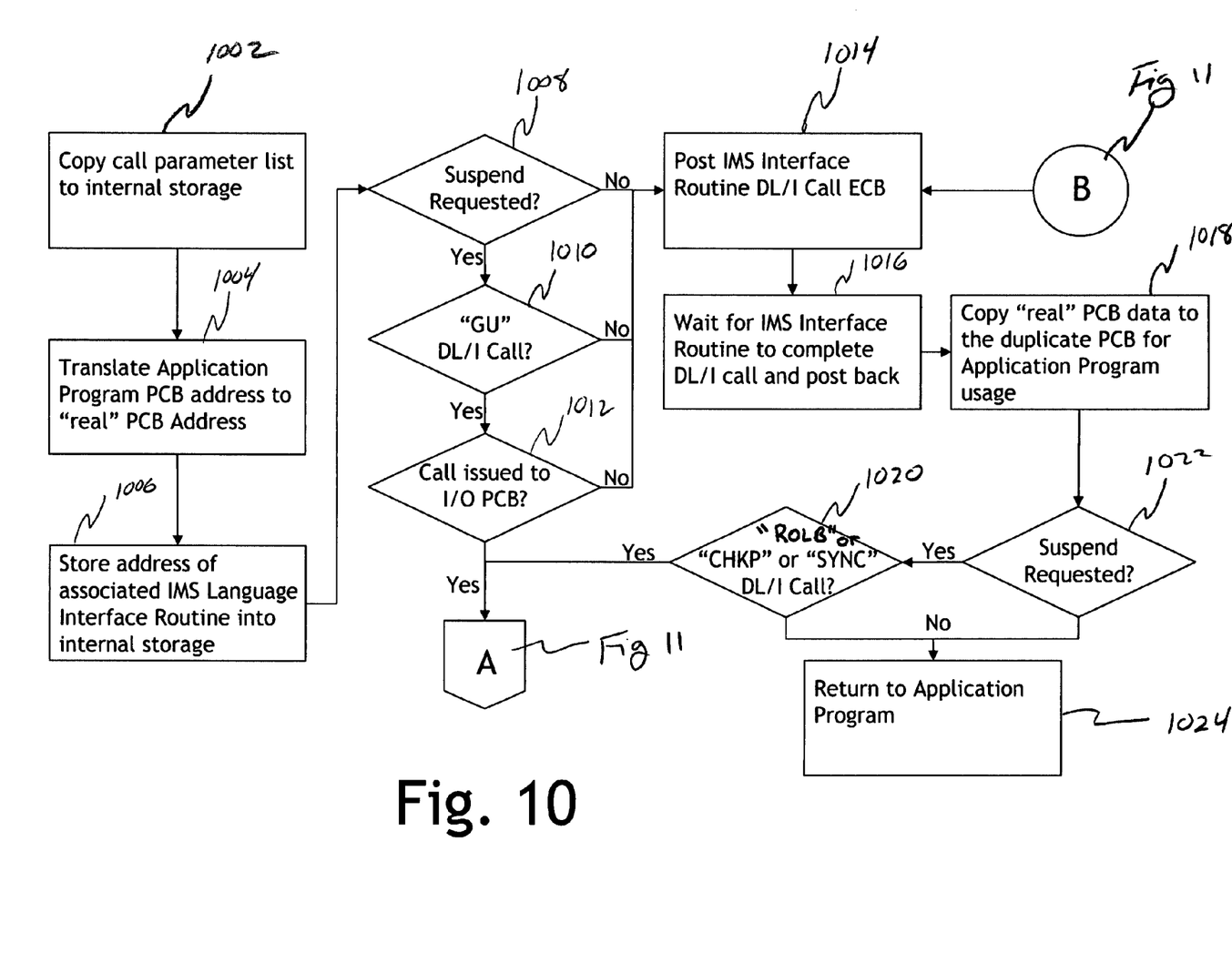
Figure 11:
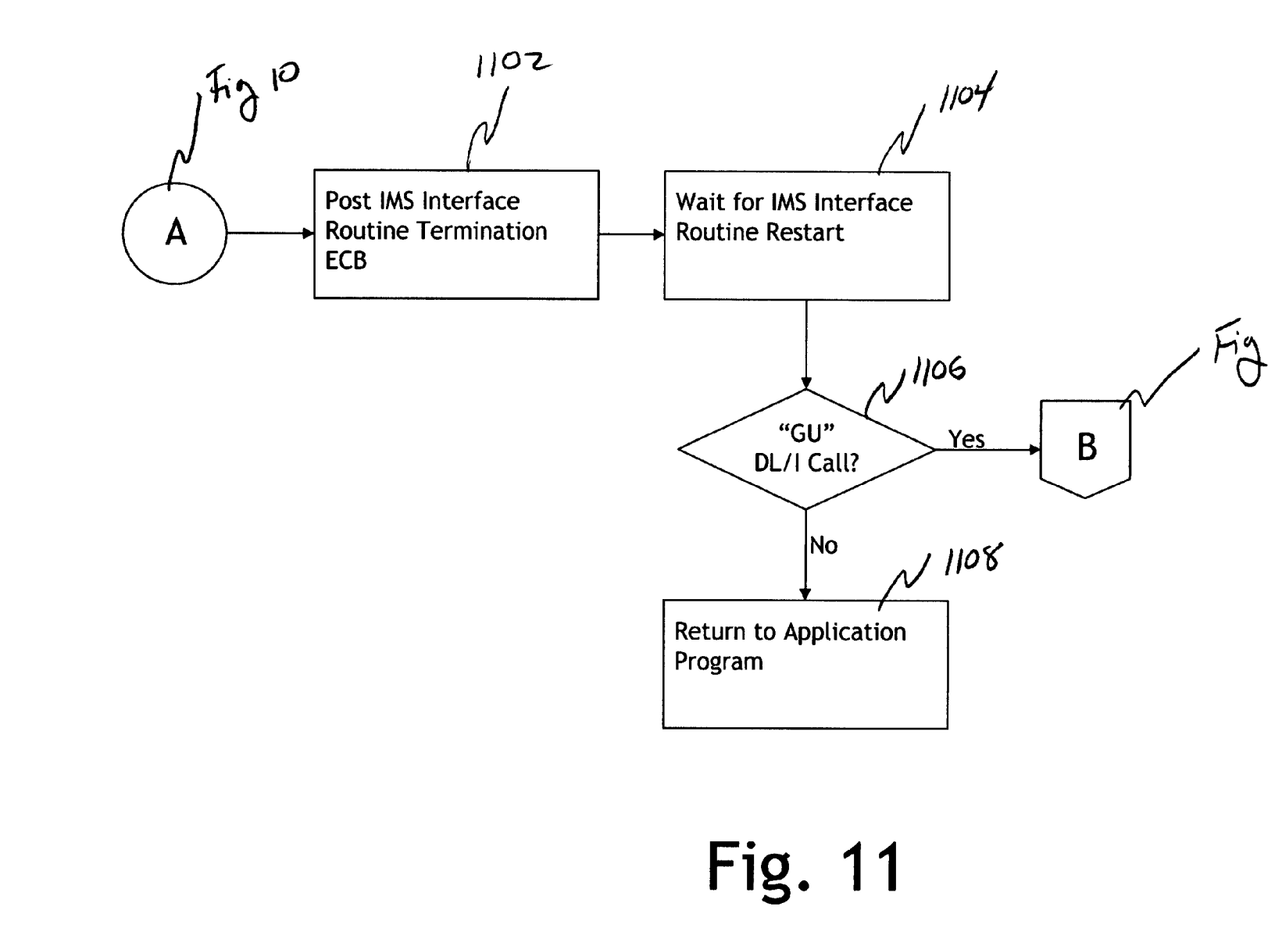

This routine comprises four separate routines that are used to "front-end" the calls to the following IMS Language Interface Routines:

DFSLIE00—DL/I Call Interface
DFSLIE20—AIB Call Interface
DFSESPR0—External Subsystem Call Interface
DFSEIBP0—EXEC-DLI Call Interface As illustrated in FIGS. 10 and 11, these routines follow the same pattern:

In step 1002, copy the address of the call parameter list to internal storage.

In step 1004, convert the PCB address in the call parameter list to its corresponding "real" PCB address.

In step 1006, copy the "real" IMS Language Interface Routine address and store it in internal storage.

If the "suspend" flag is on (step 1008) and the application is issuing a "GU" call (step 1010) to the I/O PCB (step 1012), post the IMS Interface Routine to terminate (FIG. 11; step 1102). Wait to be "resumed" (step 1104).

Otherwise, in step 1014, post the IMS Interface Routine indicating that it needs to process a DL/I call (step 1106; FIG. 11).

In step 1016, wait for the IMS Interface Routine to post back that the call is complete.

In step 1018, if there is a post back that the call is complete, copy the "real" PCB data to the duplicate PCB area used by the application program.

If the "suspend" flag is on (step 1022) and the application successfully completed a "CHKP," "SYNC," or "ROLB" call (step 1020), post the IMS Interface Routine to terminate. Wait to be "resumed" (FIG. 11).

If there is no "GU" DL/I call in step 1106, or no "suspend" requested in step 1022, or no "CHKP," "SYNC," or "ROLB" call in step 1020, return to the application program (step 1024; FIG. 10) (step 1108; FIG. 11).

Those skilled in the art will appreciate that any software program instructions of the present invention are capable of being distributed as one or more program products, in a variety of forms, and that the present invention applies equally regardless of the particular type of program storage media used to actually carry out the distribution. Examples of program storage media include recordable type media such as floppy disks, CD-ROM, and magnetic tape transmission type media such as digital and analog communications links, as well as other media storage and distribution systems.

Additionally, the foregoing detailed description has set forth various embodiments of the present invention via the use of block diagrams, flowcharts, and/or examples. It will be understood by those of ordinary skill within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, may be implemented in standard Integrated Circuits, as a computer program running on a general-purpose machine having appropriate hardware, such as one or more computers, as firmware, or as virtually any combination thereof and that designing the circuitry and/or writing the code for the software or firmware would be well within the skill of one of ordinary skill in the art, in view of this disclosure.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A method of enabling an IMS batch application program to temporarily release its access to IMS resources that it shares with an IMS database management system or other non-IMS system agent, without terminating the application program, comprising:

identifying when said batch application program issues a call that generates a sync point;

disconnecting said batch application program's connection to said IMS resources; and reestablishing said batch application program's connection to said IMS resources;

wherein said reestablishing of said batch application program's connection to said IMS resources occurs without said program being restarted.

2. A method of enabling an IMS batch application program to temporarily release its access to IMS resources that it shares with an IMS database management system or other non-IMS system agent, without terminating the application program, comprising:
- identifying when said batch application program issues a call that generates a sync point;
- disconnecting said batch application program's connection to said IMS resources;
- reestablishing said batch application program's connection to said IMS resources; and
- wherein said batch application program retains access to any independently obtained non-IMS resources when said program is disconnected from said IMS resources.

3. A method of enabling an IMS batch application program to temporarily release its access to IMS resources that it shares with an IMS database management system or other non-IMS system agent, without terminating the application program, comprising:
- identifying when said batch application program issues a call that generates a sync point;
- disconnecting said batch application program's connection to said IMS resources;
- reestablishing said batch application program's connection to said IMS resources;
- enabling said batch application program to receive a response to said call; and
- wherein said reestablishing of said batch application program's connection to said IMS resources occurs without said program being restarted.

4. A method of enabling an IMS batch application program to temporarily release its access to IMS resources that it shares with an IMS database management system or other non-IMS system agent, without terminating the application program, comprising:
- identifying when said batch application program issues a call that generates a sync point;
- disconnecting said batch application program's connection to said IMS resources;
- reestablishing said batch application program's connection to said IMS resources;
- enabling said batch application program to receive a response to said call; and
- wherein said batch application program retains access to any independently obtained non-IMS resources when said program is disconnected from said IMS resources.

5. A method of enabling each of a plurality of IMS batch application programs to temporarily release their access to IMS resources that they share with an IMS database management system or other non-IMS system agent, without terminating the application programs, comprising:
- identifying when each said batch application program issues a call that generates a sync point;
- after each of said plurality of IMS batch application programs issues said call,
- disconnecting each said batch application program's connection to said IMS resources; and
- reestablishing each said batch application program's connection to said IMS resources;
- wherein said reestablishing of each said batch application program's connection to said IMS resources occurs without each said program being restarted.

6. A method of enabling each of a plurality of IMS batch application programs to temporarily release their access to IMS resources that they share with an IMS database management system or other non-IMS system agent, without terminating the application programs, comprising:
- identifying when each said batch application program issues a call that generates a sync point;
- after each of said plurality of IMS batch application programs issues said call,
- disconnecting each said batch application program's connection to said IMS resources;
- reestablishing each said batch application program's connection to said IMS resources; and
- wherein each said batch application program retains access to any independently obtained non-IMS resources when said program is disconnected from said IMS resources.

7. One or more program storage media readable by a machine and containing instructions for performing the method contained in claim 1.

8. One or more program storage media readable by a machine and containing instructions for performing the method contained in claim 2.

9. One or more program storage media readable by a machine and containing instructions for performing the method contained in claim 3.

10. One or more program storage media readable by a machine and containing instructions for performing the method contained in claim 4.

11. One or more program storage media readable by a machine and containing instructions for performing the method contained in claim 5.

12. One or more program storage media readable by a machine and containing instructions for performing the method contained in claim 6.

* * * * *